(12) United States Patent
Maino et al.

(10) Patent No.: US 7,992,193 B2
(45) Date of Patent: Aug. 2, 2011

(54) METHOD AND APPARATUS TO SECURE AAA PROTOCOL MESSAGES

(75) Inventors: Fabio Maino, Palo Alto, CA (US); Michael Fine, San Francisco, CA (US); Irene Kuffel, Napa, CA (US); Arthur Zavalkovsky, Netanya (IL)

(73) Assignee: Cisco Technology, Inc., San Jose, CA (US)

( * ) Notice: Subject to any disclaimer, the term of this patent is extended or adjusted under 35 U.S.C. 154(b) by 1311 days.

(21) Appl. No.: 11/083,855

(22) Filed: Mar. 17, 2005

(65) Prior Publication Data

US 2006/0212928 A1 Sep. 21, 2006

(51) Int. Cl.
*G06F 7/04* (2006.01)
*H04L 9/32* (2006.01)
*H04L 9/00* (2006.01)

(52) U.S. Cl. ............... 726/4; 726/3; 726/5; 713/181; 380/277

(58) Field of Classification Search .............. 726/2–5; 713/181; 380/277, 282
See application file for complete search history.

(56) References Cited

U.S. PATENT DOCUMENTS

| | | | |
|---|---|---|---|
| 6,687,252 B1 | 2/2004 | Bertrand et al. | |
| 6,721,886 B1 * | 4/2004 | Uskela | 713/168 |
| 6,912,223 B1 | 6/2005 | Sloane | |
| 6,985,519 B1 * | 1/2006 | Barnes et al. | 375/220 |
| 7,181,530 B1 | 2/2007 | Halasz et al. | |
| 2002/0012433 A1 | 1/2002 | Haverinen et al. | |
| 2002/0026573 A1 * | 2/2002 | Park | 713/155 |
| 2003/0110394 A1 | 6/2003 | Sharp et al. | |
| 2003/0235175 A1 | 12/2003 | Naghian et al. | |
| 2004/0255164 A1 | 12/2004 | Wesemann | |
| 2004/0268140 A1 | 12/2004 | Zimmer et al. | |
| 2005/0076210 A1 * | 4/2005 | Thomas et al. | 713/165 |
| 2005/0081036 A1 * | 4/2005 | Hsu | 713/171 |
| 2005/0086504 A1 * | 4/2005 | You et al. | 713/193 |
| 2005/0273592 A1 * | 12/2005 | Pryor et al. | 713/150 |
| 2006/0259759 A1 | 11/2006 | Maino et al. | |

OTHER PUBLICATIONS

Blunk, et al., "PPP Extensible Authentication Protocol (EAP)", RFC 2284, 1998.
Tsai et al., "A Simulation for Verification and Development of Fibre Channel", IEEE Explore, 1993.

(Continued)

*Primary Examiner* — Hosuk Song
*Assistant Examiner* — Suman Debnath
(74) *Attorney, Agent, or Firm* — Hickman Palermo Truong & Becker LLP

(57) ABSTRACT

A method and an apparatus are disclosed for securing authentication, authorization and accounting (AAA) protocol messages. An encryption key, a device identifier value, and verification data are received and stored at a network device. The verification data comprises in part a copy the encryption key and the device identifier value, and has been encrypted using a private key of a server. A shared secret is generated by applying a computational function to the encryption key and the device identifier value. Based on the shared secret, a first message integrity check value for a message is generated. The message, the first integrity check value, and the verification data are sent to the server. The server decrypts the verification data using the private key, extracts the encryption key and the device identifier value, and generates the same shared secret by applying the same computational function to the extracted encryption key and device identifier value. Based on this generated shared secret, a second message integrity check value is generated and compared to the received first message integrity check value.

30 Claims, 8 Drawing Sheets

OTHER PUBLICATIONS

C. Finseth, "An Access Control Protocol, Sometimes called TACACS", Network Working Group Request for Comments: 1492, Jul. 1993.

G. Zorn, "Microsoft Vendor-specific RADIUS Attributes", Network Working Group Request for Comments: 2548, Mar. 1999.

C. Rigney, et al., "Remote Authentication Dial in User Service (RADIUS)", Network Working Group Request for Comments: 2865, Jun. 2000.

P. Calhoun, et al., "Diameter Base Protocol", Network Working Group Request for Comments: 3588, Sep. 2003.

Maino, Fabio. "EAP: a Common Extensible Encapsulation Protocol for Authentication in FC-SP." Published Dec. 9, 2002 to the T11 Website, pp. 1-18.

Cam Winget, N. et al., "Draft-cam-winget-eap-fast-00.txt", Internet Draft, Information, http://tools.ietf.org/id/draft-cam-winget-eap-fast-00.txt, Feb. 9, 2004, 66 pages.

\* cited by examiner

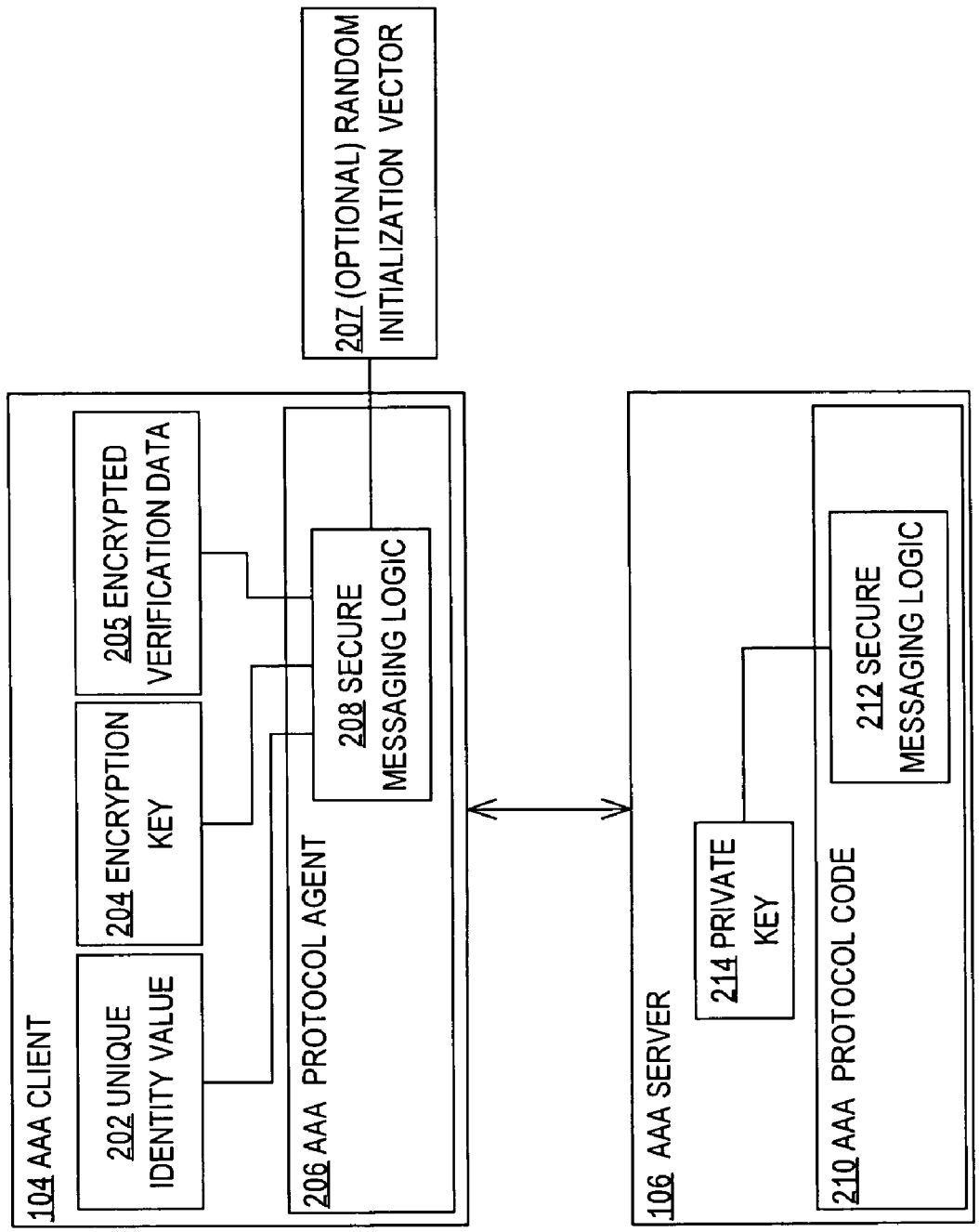

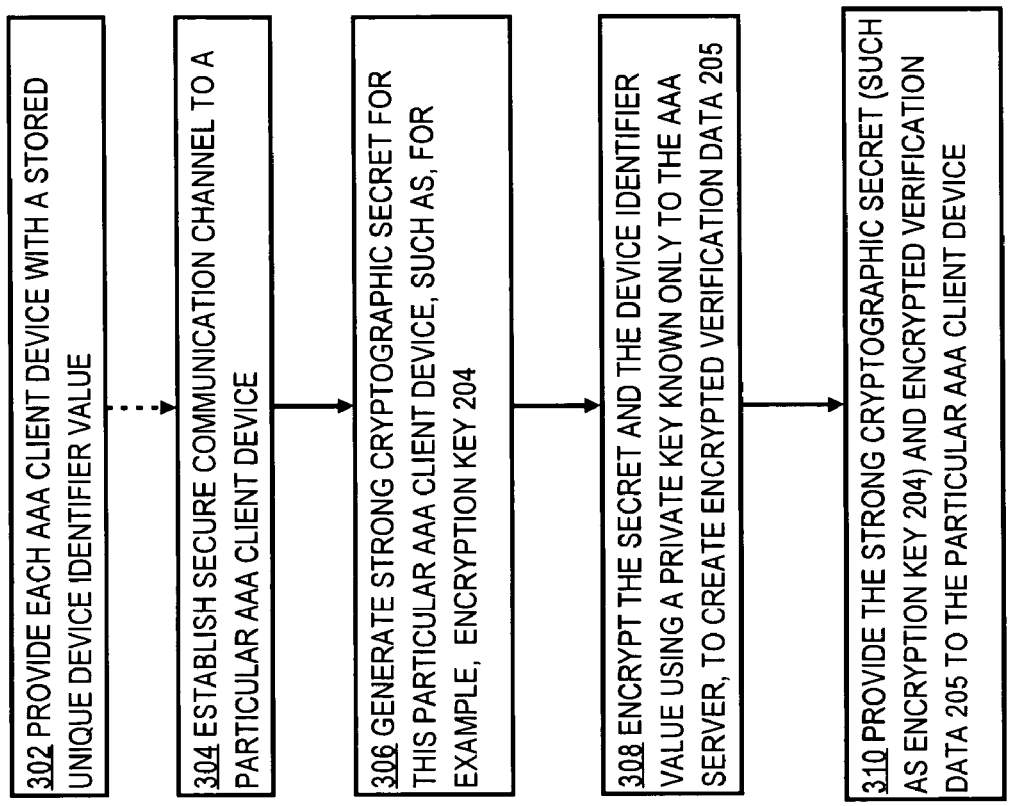

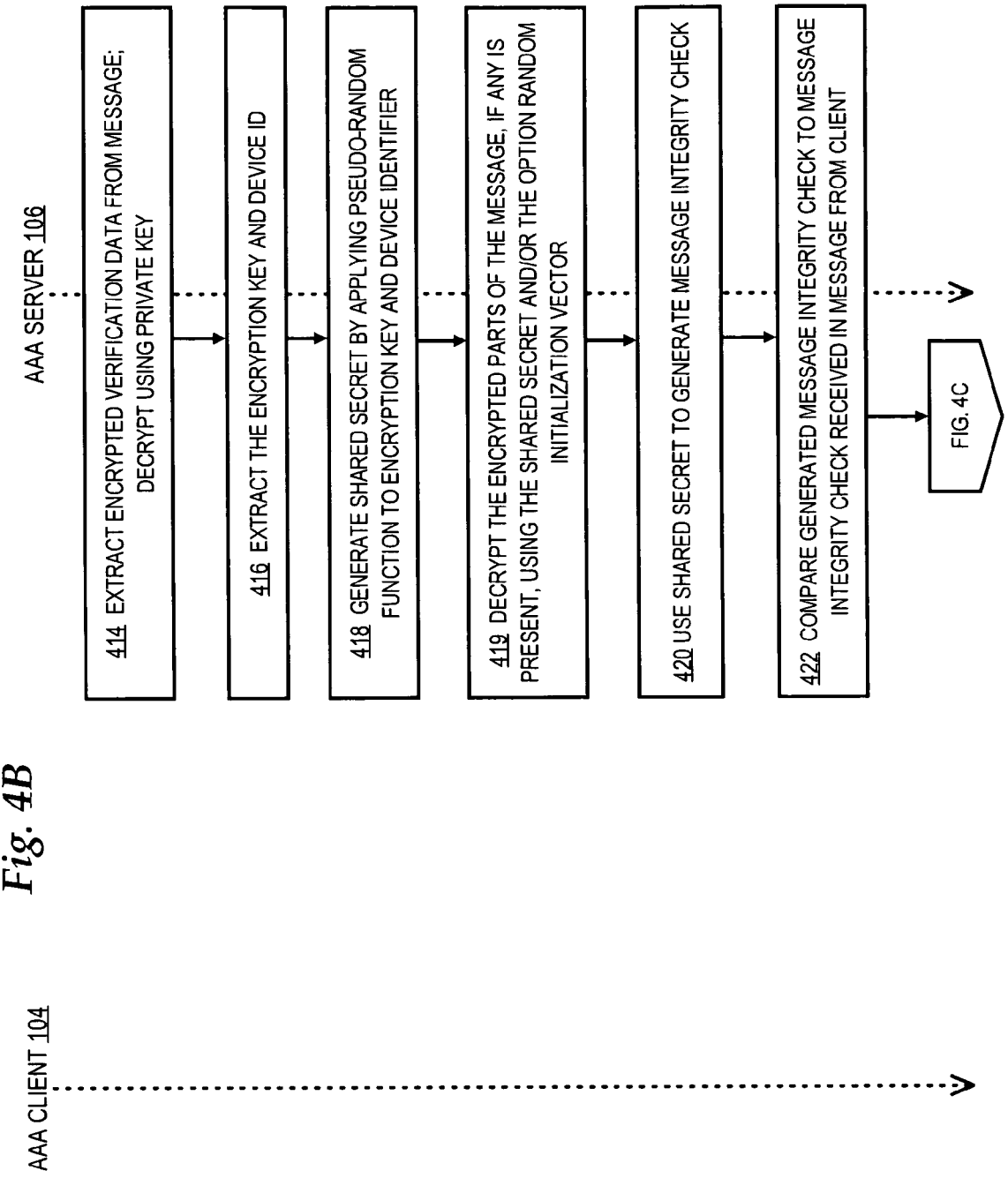

METHOD AND APPARATUS TO SECURE AAA PROTOCOL MESSAGES

RELATED APPLICATIONS

This application is related to U.S. patent application Ser. No. 11/130,654, entitled "METHOD AND APPARATUS FOR SECURELY ADMITTING A NETWORK DEVICE TO A PROTECTED NETWORK", filed by Fabio Maino et al., on May 16, 2005, the contents of which are herein incorporated by reference for all purposes as if originally set forth herein.

FIELD OF THE INVENTION

The present invention generally relates to network communication security. The invention relates more specifically to a method and apparatus for securing authentication, authorization and accounting protocol messages.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Authentication, Authorization, and Accounting (AAA) client/server protocols are used in computer networks to authenticate users or devices, to authorize the use of resources by users or devices, and to generate and store accounting information of how the users or the devices utilize the resources. Under AAA protocols, authentication, authorization and configuration information is typically exchanged between clients and AAA servers in messages that are transported over wired or wireless networks. The AAA servers may provide services over AAA protocols to users and/or devices, so in the paragraphs that follow the description of providing services to users is to be regarded in an illustrative rather than a restrictive sense. Typically, the clients are responsible for receiving information from a user or device, passing the information to an AAA server or servers, and acting on the response that is returned. The AAA servers are responsible for receiving user or device connection requests, authenticating the user or the device, and then returning all configuration information necessary for the client to deliver service to the user or the device.

AAA protocols usually require identifying clients and servers by their network addresses. The communications between the clients and AAA servers are based on these network addresses. Furthermore, most AAA protocols provide mechanisms for securing the communications between clients and servers, such as use of shared secrets, encrypting user names and passwords, challenge-response authentication, and/or public/private key encryption of protocol messages. Invariably however, these security mechanisms are based, or depend tightly, on the network addresses of the clients. This tight coupling of security mechanisms with client network addresses has numerous disadvantages.

One such disadvantage is that AAA protocols do not scale very well for large networks, in part because in order to maintain proper AAA protocol security an AAA server must store and maintain client information. Since the security mechanism is tied to a client network address, the AAA server must maintain at least the client network address of a client in order to be able to securely communicate with the client. For example, in large networks that can accept an arbitrary number of AAA clients, such as wireless networks with multiple access points, an AAA server has to maintain a database of client information for potentially a very large number of clients.

Moreover, in some networks a client may have more than one network address. For example, in a computer network, a network element, e.g. a router, may have several network addresses. Thus, to provide services to this network element over an AAA protocol, an AAA server must maintain separate security information for each network address of the same network element. Furthermore, in large computer networks where the clients usually do not have static network addresses but are assigned network addresses dynamically, it may be practically impossible to employ AAA servers to keep track of all network address changes, while at the same time providing services over a secure AAA protocol.

When network addresses are dynamically assigned to clients, another disadvantage is the significant security risk and/or manual configuration involved in employing AAA protocols to deploy new clients that have not yet been assigned network addresses. The security mechanisms of the AAA protocols usually depend on the client network addresses to provide for secure communications. Using these security mechanisms to deploy clients that do not yet have network addresses usually involves transmission of un-secure or minimally secured messages between clients and AAA servers. Furthermore, there are significant difficulties in using AAA protocols to securely deploy and communicate with an isolated network device that is connected to an established network element but that cannot obtain a network address at all.

One past approach that attempts to address the disadvantage of using AAA protocols to securely deploy new clients is the use of AAA protocols with very weak security. In this approach, all new clients are manually provisioned with the same secret, password, or encryption key, which are used to communicate with the AAA servers during initial client deployment. Another approach attempted in the past is to use the security credentials of an administrator or the security credentials of a trusted intermediary device to deploy new clients. Both of these past approaches, however, introduce new security-related problems. In the first approach, all new clients use the same secret, which, if exposed, will compromise the deployment of all existing and future clients. In the second approach, an administrator or an intermediary device must expressly trust that a new client being deployed is not an imposter, thus shifting a major portion of the security burden from the AAA server to the administrator or the intermediary device.

Several AAA protocols suffer from the above-mentioned disadvantages including the Terminal Access Controller Access Control System (TACACS) protocol and Remote Authentication Dial-In User Service (RADIUS) protocol. The TACACS protocol is a User Datagram Protocol (UDP)-based, access-control protocol described by RFC1492 that was published by the Internet Engineering Task Force (IETF) in July 1993. It provides for exchanging Network Access Server (NAS) information between a network device and a centralized database. The original TACACS implementation used a username/password authentication mechanism in which the username and the password were transmitted in clear text. Newer implementations of TACACS use a challenge-response authentication mechanism for authenticating and authorizing users, and a first-level security mechanism based on the Internet Protocol (IP) addresses of the clients. The first-level security mechanism includes keeping an IP address permit list at the TACACS server, and allowing communications only with IP addresses that are on the list.

RADIUS is a widely used AAA protocol that also uses UDP for communications between RADIUS clients and RADIUS servers. RADIUS is defined in RFC2865 that was published by IETF in June 2000. RADIUS clients and servers are identified by their IP addresses. RADIUS messages are secured by binding a secret to a client IP address. The secret is shared between the client and the server and is never transmitted over the network. The RADIUS protocol employs the shared secret to compute a Message Integrity Check value that is included in RADIUS requests and responses so that the receiver can verify the origin and integrity of a given message.

Both TACACS and RADIUS servers must store client information. The client information includes at least the IP addresses of the client and, in the case of RADIUS, the shared secret. Both TACACS and RADIUS share the disadvantages mentioned above—they do not scale to networks that may potentially include a large number of clients, and there are significant security risks in using these protocols to deploy new clients that have not yet been assigned IP addresses.

Based on the foregoing, there is a clear need for a technique for securing AAA protocol messages that overcomes the disadvantages mentioned above.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates an overview of the components included in an authentication, authorization and accounting (AAA) protocol client and an AAA server according to an embodiment;

FIG. 3 is a flow diagram that illustrates an overview of a technique for provisioning an AAA client according to an embodiment;

FIG. 4B is a flow diagram that illustrates an overview of a technique for verifying an AAA protocol message at an AAA server according to an embodiment;

DETAILED DESCRIPTION

Figure 1:
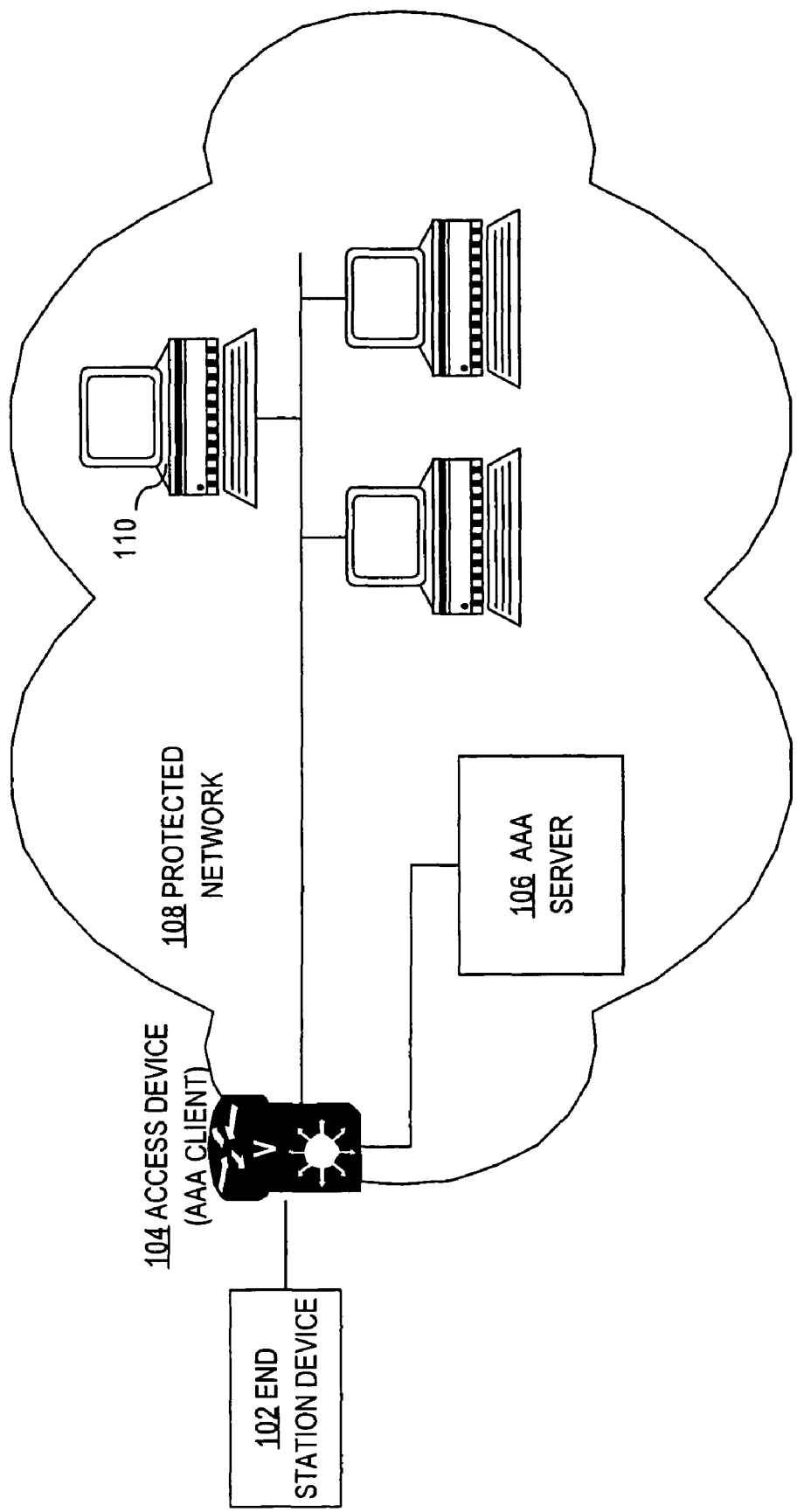
FIG. 1 is a block diagram that illustrates a high-level overview of a system in which an embodiment may be implemented.

A method and apparatus for securing authentication, authorization and accounting (AAA) protocol messages are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Furthermore, in the following description devices are designated as a client and a server for illustration purposes only. The techniques of the present invention may be performed by peers in a network, and/or by any computer systems that exchange AAA protocol messages.

Embodiments are described herein according to the following outline:

1.0 General Overview
2.0 Structural and Functional Overview
3.0 Method of Securing AAA Protocol Messages
3.1 Process of Provisioning an AAA Client
3.2 Process of Generating an AAA Protocol Message at an AAA Client
3.3 Process of Verifying the AAA Protocol Message at an AAA Server
3.4 Process of Generating and Processing the AAA Server Response
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for securing authentication, authorization and accounting (AAA) protocol messages. A network device, which acts as an AAA client and authenticates itself in a network in communication with an AAA server, receives and stores an encryption key, a device identifier value, and verification data. The verification data comprises in part a copy of the encryption key and the device identifier that have been encrypted with a private key known only to the AAA server. The network device generates a shared secret by applying a computational function to the encryption key and the device identifier value. Based on the shared secret, a first message integrity check value for a message is generated. The network device sends the message, the first message integrity check value, and the verification data to the AAA server. The AAA server receives the message and decrypts the verification data using the private key. The encryption key and the device identifier value are extracted from the verification data. The AAA server generates the same shared secret by applying the computational function to the encryption key and the device identifier value. Based on the shared secret, a second message integrity check value for the message is generated. The AAA server then processes the message only when the first message integrity check value matches the second integrity check value.

In a feature of the aspect, the server generates a response message. A third message integrity check value for the response message is generated by using the shared secret. The response message with the third message integrity check value is then sent to the network device.

In one feature, the aspect further comprises encrypting one or more portions of the message using the shared secret. In a feature, the step of encrypting additionally includes use of a random initialization vector.

In one feature of the aspect, the encryption key and the device identifier value are generated for a particular network device. The verification data is created by encrypting the encryption key and the device identifier value with the private key known only to the AAA server. The verification data is provided to the particular network device though a secure communication channel.

In one feature of the aspect, the verification data is created by encrypting the encryption key and the device identifier value with a public key (e.g. the public portion of a Rivest-Shamir-Adelman (RSA) private/public key pair) of the AAA server. The AAA server will use its corresponding private key to extract the encryption key from the verification data. The public key of the AAA server may be provided to the AAA client through any secure channel (e.g., a digital certificate).

In one feature of the aspect, the server is a RADIUS protocol authentication, authorization, and accounting server, and the client device is a RADIUS client. In this feature, the RADIUS client performs the steps of: receiving and storing the encryption key, the device identifier value, and the verification data; generating the shared secret by applying the computational function to the encryption key and the device identifier value; generating, based on the shared secret, a first message integrity check value for a message; and sending the message, the first message integrity check value, and the verification data to the server. In this feature, the RADIUS server performs the steps of: decrypting the verification data using the private key known only to the server; extracting the encryption key and the device identifier value from the verification data; generating the shared secret by applying the computational function to the encryption key and the device identifier value; generating, based on the shared secret, a second message integrity check for value for the message; and further processing the message only when the first message integrity check value matches the second integrity check value. In a different feature of the aspect, the client is a TACACS client that performs the foregoing client steps, and the server is a TACACS server that performs the foregoing server steps.

In a feature of the aspect, the computational function is a one-way hash function using Secure Hash Algorithm 1 (SHA-1). In another feature, the computational function is a pseudo-random function.

In one feature of the aspect, the encryption key is a large random integer. In a different feature, the encryption key is a Protected Access Credential (PAC) key.

In a feature of the aspect, the device identifier value is a Network Access Identifier (NAI).

In other aspects, the invention encompasses a computer apparatus and a computer-readable medium configured to carry out the foregoing steps.

2.0 Structural and Functional Overview

FIG. 1 is a block diagram that illustrates a high-level overview of a system in which an embodiment may be implemented. End station device 102 is communicatively and/or operatively connected to access device 104. Access device 104 is an Authentication, Authorization, and Accounting (AAA) client that is communicatively connected to AAA server 106, and that provides access to protected network 108. One or more workstations, servers, or network elements, such as network element 110, are communicatively connected to protected network 108, and provide various services to clients that are authenticated and authorized to access resources in the network.

End station device 102 is any software or hardware device that is capable of performing various functionalities, such as, for example, receiving input from a user, and rendering data to the user. End station device 102 may be any device that can request services from network elements in protected network 108. Examples of such devices include, but are not limited to, computer hosts using dial-up clients, Local Area Network (LAN) clients, and/or Wide Area Network (WAN) clients to connect to protected network 108, and mobile telephone devices where protected network 108 is a wireless telephone network.

AAA client 104 is communicatively connected to end station devices, such as end station device 102. AAA client 104 acts as an access point to protected network 108 by maintaining one or more connections with each end station device. In some embodiments, AAA client 104 runs on a remote access server that accepts access requests from end station devices, relays the access requests to AAA servers for authentication, and if the end station devices are authenticated, returns the AAA server responses to the end station devices. AAA client 104 may run on a router located at the edge of protected network 108. AAA client 104 may also run on a software or hardware firewall that is responsible for secure routing of traffic to the network. In other embodiments, AAA client 104 runs on a mobile communications server that accepts requests from wireless devices, such as cellular telephones, and provides access to a telephone network. In some embodiments, AAA client 104 may be running on an end station device, and may be configured to receive authentication information from a user and to send access requests to AAA server 106.

AAA client 104 is responsible for communicating with AAA server 106 over one or more AAA protocols. AAA server 106 provides authentication, authorization, and accounting services to users and end station devices that request access to protected network 108. In different embodiments, AAA server 106 may be a computer host or a specialized software or hardware component that includes one or more sequences of instructions capable of performing the foregoing tasks.

In operation, end station device 102 connects to AAA client 104, and requests access to protected network 108. In some embodiments, end station device 102 provides AAA client 104 with some access credentials. In other embodiments, AAA client 104 replies by requesting particular authentication information.

FIG. 2 is a block diagram that illustrates an overview of the components included in an AAA client and an AAA server according to one embodiment. AAA client 104 is communicatively connected to AAA server 106 and includes AAA protocol agent 206. AAA client 104 also stores unique identity value 202, encryption key 204, and encrypted verification data 205.

Unique identity value 202, also referred herein as device identifier value, uniquely identifies the client device on which AAA client 104 runs. Encryption key 204 is a value that is used to compute a secret that is shared between the client and the server. Unique identity value 202 and encryption key 204 may be provided to AAA client 104 specifically to support communications with AAA server 106 over an AAA protocol, or may be provided for purposes unrelated to the implementation of the AAA protocol.

Encrypted verification data 205 includes at least unique identity value 202 and encryption key 204, which are encrypted using private key 214 that is known only to AAA server 106. AAA client 104 cannot decrypt encrypted verification data 205 since it does not know private key 214.

AAA protocol agent 206 is a module that has access to unique identity value 202, encryption key 204, and encrypted verification data 205. AAA protocol agent 206 also includes secure messaging logic 208. Secure messaging logic 208 generates a shared secret by applying a computational function to encryption key 204 and unique identity value 202. Secure messaging logic 208 then uses the shared secret to compute a message integrity check for a message that is to be sent to the AAA server 106. Secure messaging logic 208 may optionally encrypt one or more portions of the message with the shared secret, derived with a computational function from encryption key 204, and/or random initialization vector 207. AAA client 104 then sends the message, the integrity check value, and encrypted verification data 205 to AAA server 106.

AAA server 106 stores private key 214 that is used to generate verification data 205. AAA server 106 also includes AAA protocol code 210, which in turn includes secure messaging logic 212. Upon receiving the message from AAA client 104, secure messaging logic 212 decrypts verification data 205 using private key 214, and extracts encryption key 204 and unique identity value 202 that are included therein. Secure messaging logic 212 then generates the shared secret by applying the same computational function to encryption key 204 and unique identity value 202 and, based on the shared secret, further generates a message integrity check for the message. Secure messaging logic 212 then compares the just generated message integrity check with the message integrity check included in the message. If the two message integrity checks do not match, the message is discarded as it is not authentic. If one or more portions of the message were encrypted with the shared secret and the random initialization vector 207, the AAA server 106 will first decrypt the message using the shared secret derived with a computational function from the encryption key 204 that is extracted from the received encrypted verification data 205.

If the two message integrity checks match, secure messaging logic 212 notifies AAA protocol code 210 to further process the message. AAA protocol code 210 then can generate a response message, and can compute a message integrity check for the response message by using the shared secret. AAA server 106 sends the response message, along with the message integrity check for the response message, to AAA client 104. Upon receiving the response message at AAA client 104, secure messaging logic 208 uses the shared secret to generate a message integrity check for the response message. Secure messaging logic 208 then compares the just generated message integrity check to the message integrity check included along with the response message. If the two message integrity checks do not match, the response message is discarded as it is not authentic. If the two message integrity checks match, AAA client 104 is notified that it can further process the response message. The shared secret is thus established between AAA client 104 and AAA server 106. The client and the server can securely exchange AAA protocol messages by computing (based on the shared secret) and comparing a message integrity check for each exchanged message. The AAA server 106 may optionally encrypt one or more portions of the response message using the shared secret, derived with a computational function from encryption key 204, and/or random initialization vector 207.

By using the technique described above, an AAA client device and an AAA server can securely establish a shared secret without ever transmitting over the communication link any of the components (the encryption key and the unique identity value) that are used to compute the shared secret. Moreover, the AAA server does not keep any AAA client-specific information since it generates the shared secret from information included in the AAA protocol message. Furthermore, the shared secret is based on the identity of the device on which the client runs, and is thus decoupled from the network address or addresses of the AAA client.

3.0 Method of Securing AAA Protocol Messages 3.1 Process of Provisioning an AAA Client FIG. 3 is a flow diagram that illustrates an overview of a technique for provisioning an AAA client according to an embodiment.

In step 302, each AAA client device is provided with, and stores, a unique device identifier value. The device identifier value may be pre-stored by the manufacturer of the client device, or may be manually or automatically assigned or programmed to the device by a user as part of the initial device configuration. The device identifier value may be of any size and data type that can be used to identify a client device including, but not limited to, a Network Address Identifier (NAI) and host/domain name combination. In some embodiments, the device identifier value is provided specifically for communicating with an AAA server over an AAA protocol. In other embodiments, step 302 is optional and not needed because the device identifier value has been previously provided to the client device for a completely different purpose and the AAA client can use the previously provided value.

In step 304, a secure communication channel is established to a particular client device. The secure communication channel may be any channel over which information may be securely exchanged with the device including, but not limited to, a network link, a wireless channel, and a telephone call to a user in control of the device. The secure communication channel may be used to provide the device identifier value to the client device if the device identifier value is to be assigned to the device. If the device identifier value is stored in the device by the device manufacturer, the secure communication channel may be used to retrieve the device identifier value from the device.

In step 306, a strong cryptographic secret is generated for the particular AAA client device. In some embodiments, the strong cryptographic secret is an encryption key that may be a large random integer. In other embodiments, the strong cryptographic secret may be a randomly generated value of any data type on which encryption can be based. In step 308, the strong cryptographic secret and the device identifier value are encrypted using a private key known only to the AAA server, to result in creating encrypted verification data. In other embodiments, the strong cryptographic secret 306 can be generated by the AAA client and can be provided to the AAA server through the secure communication channel established in step 304.

In one embodiment, the strong cryptographic secret is based on a Protected Access Credential (PAC). A PAC has traditionally been used to enable provisioning of a new device on a network by an AAA server thru an intermediary device already established in the network. Thus, traditionally PACs have been used between three parties, and have been associated with a username of a user and with a server authority identifier. The techniques described herein, however, may further use the PAC to authenticate a brand new client device in the network without employing intermediate devices, and without using usernames.

A PAC comprises a PAC key and encrypted PAC Opaque data. The PAC key is an encryption key of random value that may be generated exclusively for use with an AAA protocol, or may be generated for the client device for completely different reasons. The PAC Opaque data includes the PAC key and may include other information. The PAC Opaque data is encrypted with a master key known only to the server authority issuing the PAC.

As mentioned above, in one embodiment the techniques described herein make use of a PAC. In this embodiment, in step 306 a PAC key is generated for a particular client device by an AAA server. In step 308 the PAC key and the device identifier value are encrypted using a private key known only to the server. The resulting verification data is stored as the PAC Opaque data.

In step 310, the encryption key and the encrypted verification data, which includes the encrypted secret and the device identifier value, are provided to the client device using the secure communication channel established in step 304. In some embodiments that make use of PACs, a PAC key and a PAC Opaque data may have already been stored on AAA client devices when the client devices originally joined the network to which AAA server 106 belongs.

3.2 Process of Generating an AAA Protocol Message at an AAA Client

Figure 4A:
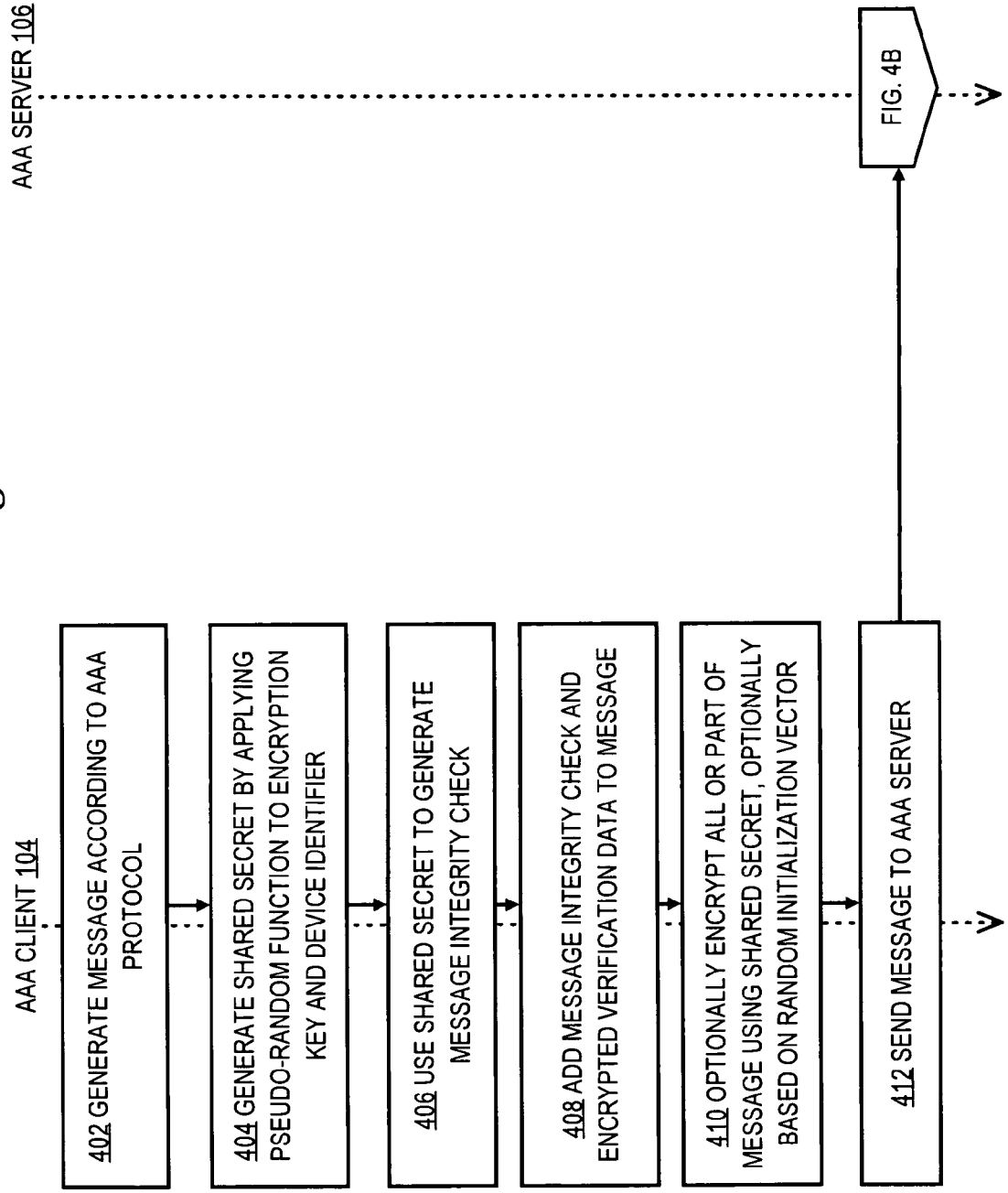
FIG. 4A is a flow diagram that illustrates an overview of a technique for generating an AAA protocol message at an AAA client according to an embodiment.

FIG. 4A is a flow diagram that illustrates an overview of a technique for generating an AAA protocol message at an AAA client according to an embodiment.

In step 402, AAA client 104 generates a message according to an AAA protocol. In step 404, a shared secret is generated by applying a computational function to the device identifier value and the strong cryptographic secret generated in step 306, such as the encryption key. The computational function may be a one-way pseudo-random hash function. The hash function may use Shared Hash Algorithm 1 (SHA-1), MD5, etc. In the embodiment making use of a PAC, AAA client 104 derives the shared secret by applying a pseudo-random function to the PAC key and the device identifier value. In some embodiments, in addition to the encryption key and the device identifier value, the computational function may also be fed some additional parameters, such as label strings or function-specific separator values.

In step 406, the shared secret is used to generate a message integrity check value for the message, and in step 408 the message integrity check value and the encrypted verification data are added to the message.

In one embodiment, the AAA protocol used between the AAA client device and the AAA server is a RADIUS protocol, and the message is a RADIUS message. Further, the encryption key used to generate the shared secret is a PAC key and the verification data is a PAC Opaque data. In this embodiment, in step 408 the message integrity check value is included in the Authenticator attribute of the RADIUS message, and the PAC Opaque verification data is also included in the message.

As part of providing additional message security, in step 410 one or more portions of the message may optionally be encrypted using the shared secret. Step 410 may, for example, be performed in the embodiment that covers the RADIUS protocol. Since a RADIUS message is made up of a header and an attribute-value space that includes one or more Attribute-Value Pairs (AVPs), some or all of the AVPs may be protected by encrypting them with the shared secret. When only some of the AVPs are encrypted with the shared secret for extra security, the RADIUS message header may include information that indicates which AVPs are encrypted. Examples of RADIUS AVPs that can be encrypted in step 410 are included in RFC2548 published by IETF in March 1999.

The encryption of one or more portions of the message performed in step 410 may also include making use of a random initialization vector. Usually, when the same message data is encrypted with the same key value the same encrypted result is obtained. In order to reduce the predictability of such a result, a randomly generated data may be included in the message in order to obtain differing results even though the same data is encrypted. The randomly generated data is usually stored in a random initialization vector that may or may not be known to both the sender and the receiver of the message.

In step 412, the message, the message integrity check value computed for the message by using the shared secret, and the encrypted verification data are sent to AAA server 106. In the embodiment that covers the RADIUS protocol, the message is a RADIUS message that includes the message integrity check and the verification data. In other embodiments, the message, the message integrity check, and the verification data may be sent separately to the AAA server.

3.3 Process of Verifying the AAA Protocol Message at an AAA Server

FIG. 4B is a flow diagram that illustrates an overview of a technique for verifying an AAA protocol message at an AAA server according to an embodiment.

After AAA server 106 receives the message from AAA client 104, in step 414 the encrypted verification data is extracted from the message and is decrypted using the private key of the server. In step 416, the encryption key and the device identifier value are extracted from the verification data. In the embodiment that uses PAC as the strong cryptographic secret, the server decrypts the PAC Opaque data and extracts from it the PAC key and the device identifier value.

In step 418, the shared secret is generated by applying to the encryption key and the device identifier value the same computational function used at the AAA client 104. In step 419, AAA server 106 decrypts the encrypted parts of the message, if any, using the shared secret and/or optionally the random initialization vector. AAA server 106 then uses the shared secret to generate a message integrity check value for the message in step 420. In step 422, AAA server 106 compares the generated message integrity check value to the message integrity check value included in the message received from AAA client 104.

Figure 4C:
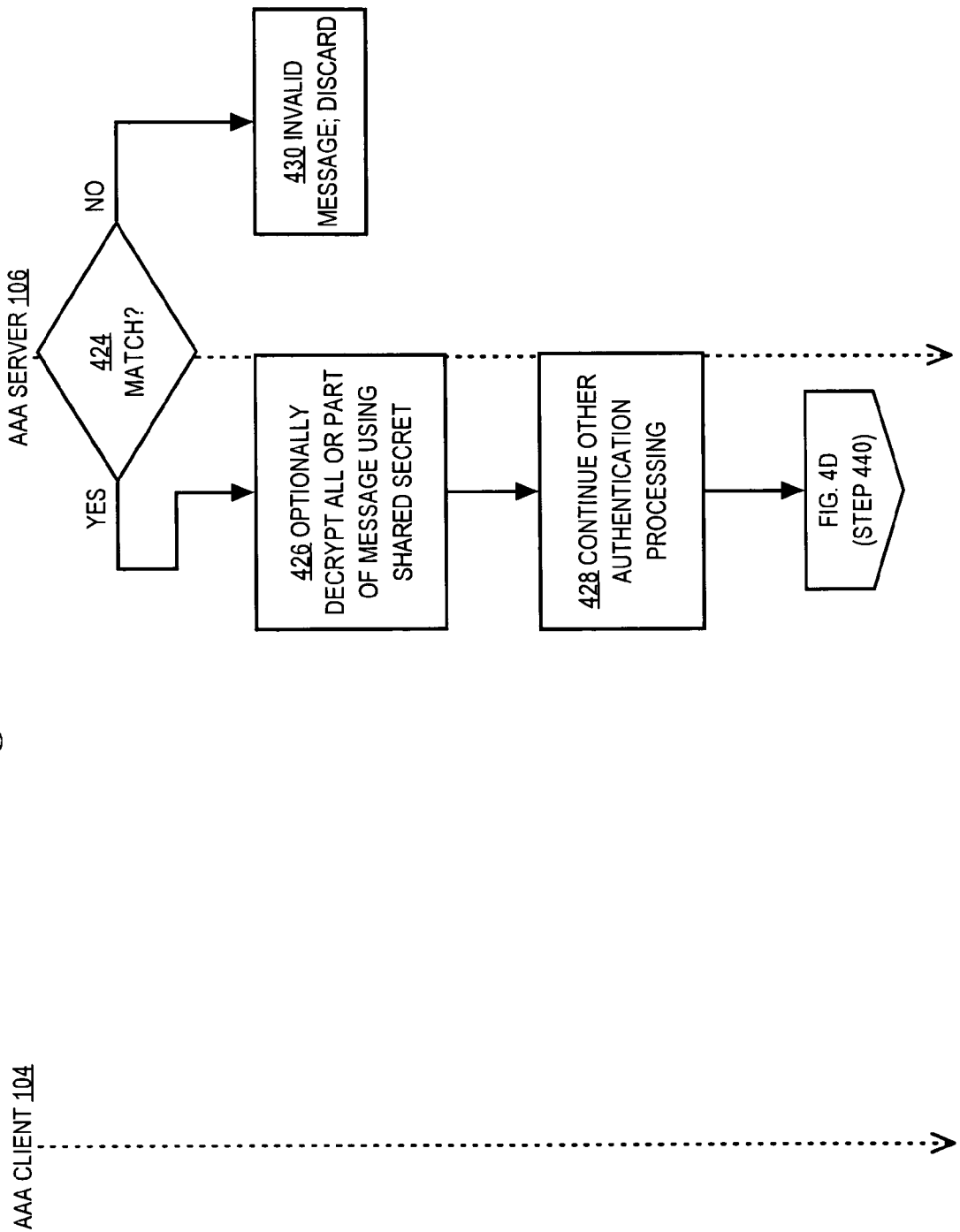
FIG. 4C is a flow diagram that is a continuation of the technique described in FIG. 4B according to an embodiment.

Referring now to FIG. 4C, in step 424 AAA server 106 determines whether the compared message integrity check values match. If the message integrity check values do not match, in step 430 the message is discarded because it is an invalid message.

If in step 424 the compared message integrity check values match, step 426 may be performed. In step 426, the portions of the message that were optionally encrypted by AAA client 104 are decrypted using the shared secret. In step 428 AAA server 106 proceeds with further authentication processing of the message.

3.4 Process of Generating and Processing the AAA Server Response

Figure 4D:
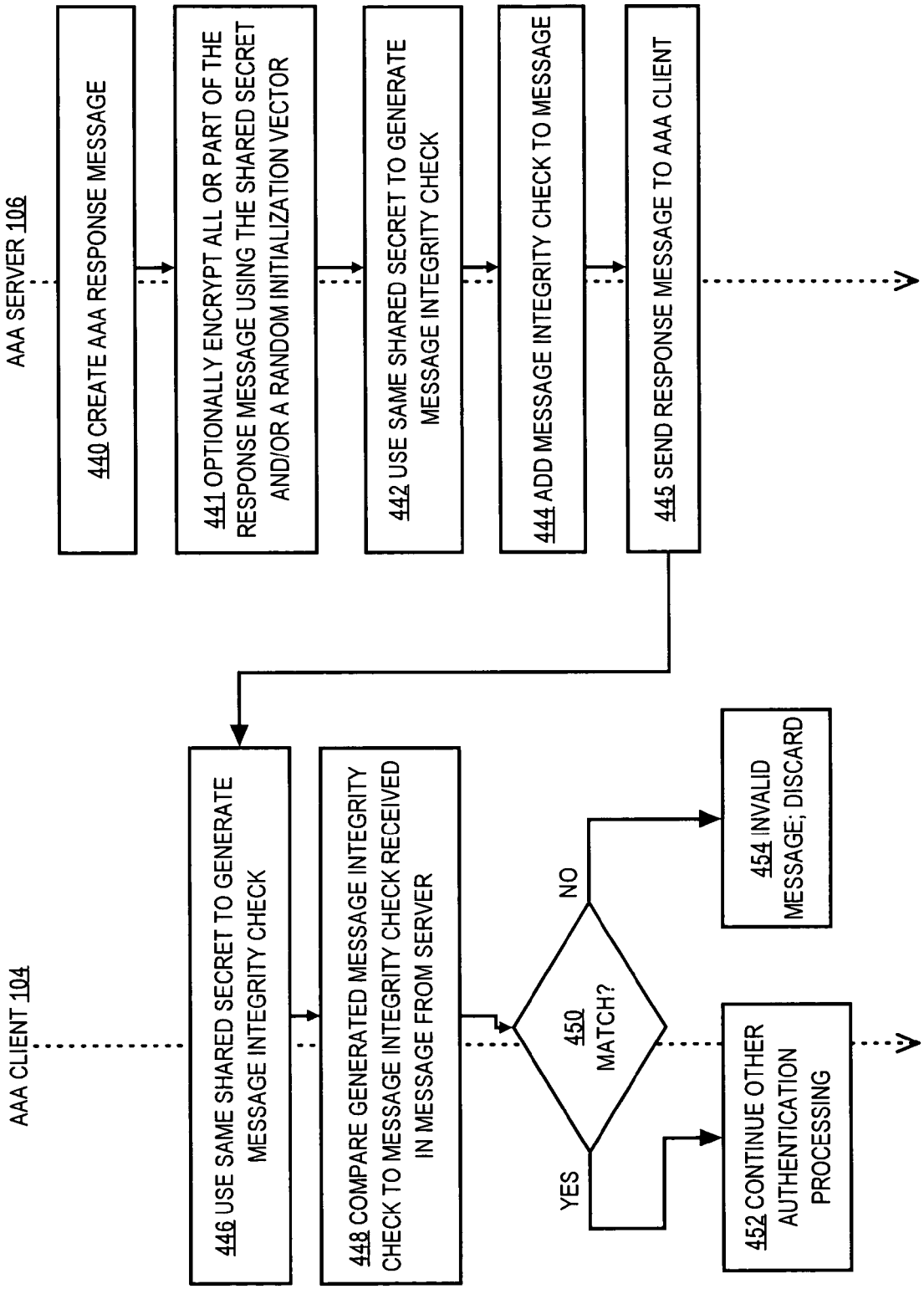
FIG. 4D is a flow diagram that illustrates an overview of techniques for generating an AAA protocol response message by an AAA server, and processing the response message at an AAA client according to an embodiment.

FIG. 4D is a flow diagram that illustrates an overview of techniques for generating an AAA protocol response message by an AAA server, and processing the response message at an AAA client according to an embodiment.

In step 440, AAA server 106 creates a response message. In step 441, AAA server 106 may optionally encrypt all or parts of the response message with the shared secret and/or a random initialization vector. In step 442, the same shared secret is used to generate a message integrity check value for the response message. In step 444, the message integrity check value is added to the response message.

In step 445, the response message and the message integrity check value for the response message are sent to AAA client 104. Depending on the AAA protocol used, in some embodiments the response message and the message integrity check value for the response message may be sent to AAA client 104 separately.

Upon receiving the response message, in step 446 AAA client 104 uses the previously computed shared secret to generate a message integrity check value for the response message. In step 448, the generated message integrity check value is compared to the message integrity check value included in the response message. If in step 450 a match is not found, in step 454 the response message is discarded because it is considered invalid and not authentic.

If a match between the compared and received message integrity check values for the response message is found in step 450, in step 452 AAA client 104 continues with other authentication message processing.

4.0 Implementation Mechanisms—Hardware Overview

Figure 5:
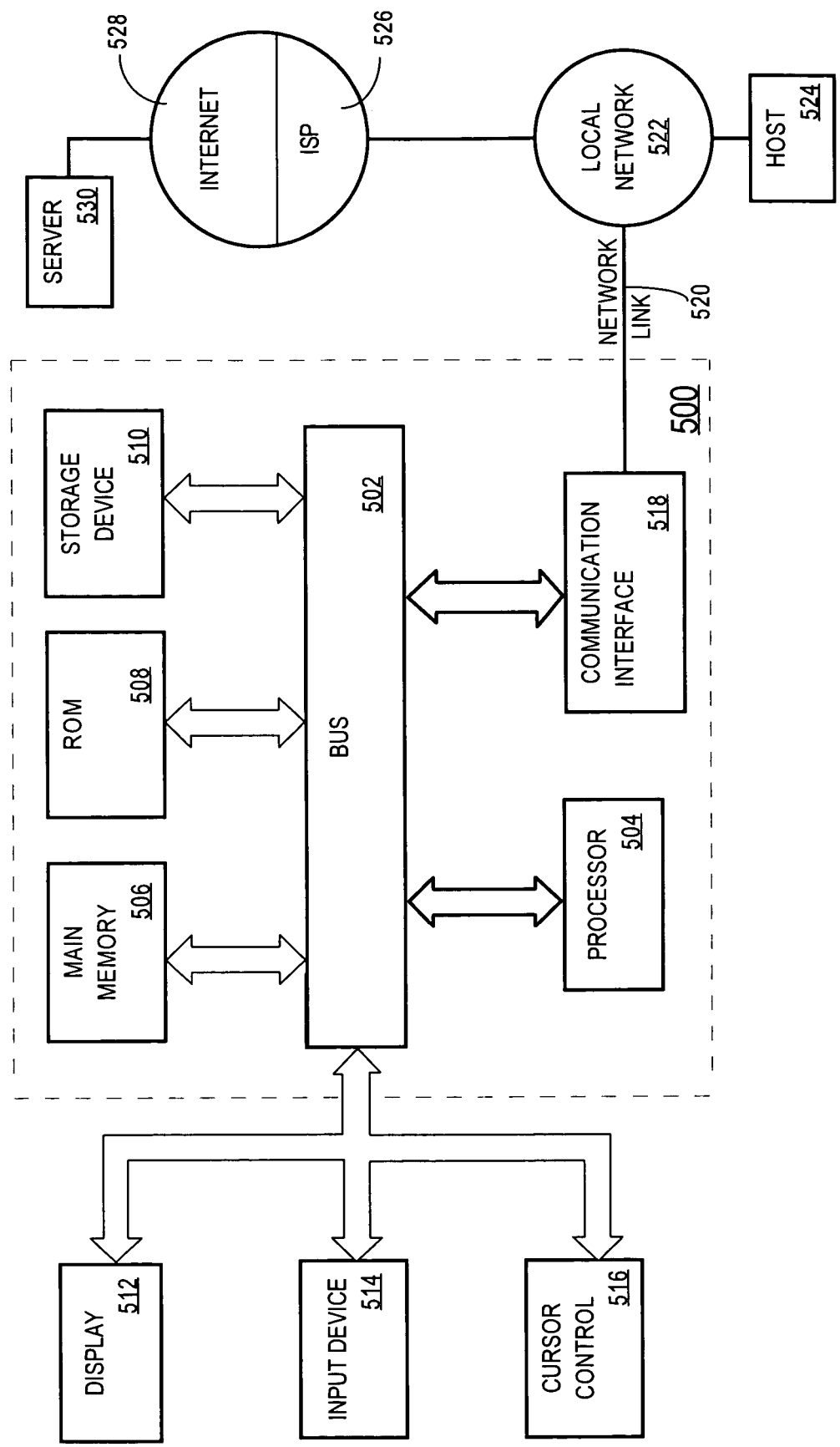
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for securing AAA protocol messages. According to one embodiment of the invention, securing AAA protocol messages is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for securing AAA protocol messages as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for securing authentication, authorization and accounting (AAA) protocol messages, the method comprising the computer-implemented steps of:
at a network device that acts as an AAA client and authenticates itself in a network in communication with an AAA server, receiving and storing an encryption key, a device identifier value, and verification data, wherein the verification data comprises in part a copy of the encryption key and the device identifier value that have been encrypted using a private key of the AAA server;
the network device generating a shared secret by applying a computational function to the encryption key and the device identifier value;
the network device generating, based on the shared secret, a first message integrity check value for an AAA message;
the network device sending the AAA message, the first message integrity check value, and the verification data to the AAA server;
at the AAA server, decrypting the verification data using the private key;
the AAA server extracting the encryption key and the device identifier value from the verification data;
the AAA server generating the same shared secret by applying the computational function to the encryption key and the device identifier value;
the AAA server generating, based on the shared secret, a second message integrity check value for the AAA message; and
the AAA server further processing the AAA message only when the first message integrity check value matches the second message integrity check value,
wherein the shared secret is independently generated at each of the network device and the AAA server.

2. A method as recited in claim 1, further comprising:
creating an AAA response message;
generating a third message integrity check value for the AAA response message using the shared secret; and
sending the AAA response message with the third message integrity check value.

3. A method as recited in claim 2, further comprising encrypting one or more portions of the AAA response message using at least one of the shared secret and a random initialization vector.

4. A method as recited in claim 1, further comprising:
encrypting one or more portions of the AAA message using at least one of the shared secret and a random initialization vector; and
at the AAA server, decrypting the one or more portions of the AAA message using at least one of the shared secret and the random initialization vector.

5. A method as recited in claim 1, further comprising:
generating the encryption key and the device identifier value for a particular network device;
encrypting the encryption key and the device identifier value using the private key, to result in creating the verification data; and
providing the verification data to the particular network device through a secure communication channel.

6. A method as recited in claim 1, wherein the steps are performed by a Remote Authentication Dial-In User Service (RADIUS) protocol authentication, authorization and accounting (AAA) server and a RADIUS client.

7. A method as recited in claim 1, wherein the computational function is any one of a one-way hash function and a pseudo-random function.

8. A method as recited in claim 1, wherein the device identifier value is a Network Address Identifier (NAI).

9. A method as recited in claim 1, wherein the encryption key is a Protected Access Credential (PAC) key.

10. A method as recited in claim 1, wherein the steps are performed by a Terminal Access Controller Access Control System (TACACS) protocol authentication, authorization and accounting (AAA) server and a TACACS client.

11. A non-transitory computer-readable volatile or non-volatile medium storing one or more sequences of instructions for securing authentication, authorization, and accounting (AAA) protocol messages, which instructions, when executed by one or more processors, causes the one or more processors to perform:
at a network device that acts as an AAA client and authenticates itself in a network in communication with an AAA server, receiving and storing an encryption key, a device identifier value, and verification data, wherein the verification data comprises in part a copy of the encryption key and the device identifier value that have been encrypted using a private key of the AAA server;
the network device generating a shared secret by applying a computational function to the encryption key and the device identifier value;
the network device generating, based on the shared secret, a first message integrity check value for an AAA message;
the network device sending the AAA message, the first message integrity check value, and the verification data to the AAA server; at the AAA server,
at the AAA server, decrypting the verification data using the private key;
the AAA server extracting the encryption key and the device identifier value from the verification data;
the AAA server generating the same shared secret by applying the computational function to the encryption key and the device identifier value;
the AAA server generating, based on the shared secret, a second message integrity check value for the AAA message; and
the AAA server further processing the AAA message only when the first message integrity check value matches the second message integrity check value,
wherein the shared secret is independently generated at each of the network device and the AAA server.

12. A non-transitory computer-readable medium as recited in claim 11, further comprising instructions which, when executed by the one or more processors, cause the one or more processors to perform: creating an AAA response message; generating a third message integrity check value for the AAA response message using the shared secret; and sending the AAA response message with the third message integrity check value.

13. A non-transitory computer-readable medium as recited in claim 12, further comprising instructions which, when executed by the one or more processors, cause the one or more processors to perform encrypting one or more portions of the AAA response message using at least one of the shared secret and a random initialization vector.

14. A non-transitory computer-readable medium as recited in claim 11, further comprising instructions which, when executed by the one or more processors, cause the one or more processors to perform: encrypting one or more portions of the AAA message using at least one of the shared secret and a random initialization vector; and at the AAA server, decrypting the one or more portions of the AAA message using at least one of the shared secret and the random initialization vector.

15. A non-transitory computer-readable medium as recited in claim 11, further comprising instructions which, when executed by the one or more processors, cause the one or more processors to perform: generating the encryption key and the device identifier value for a particular network device; encrypting the encryption key and the device identifier value using the private key, to result in creating the verification data; and providing the verification data to the particular network device through a secure communication channel.

16. A non-transitory computer-readable medium as recited in claim 11, wherein the steps are performed by a Remote Authentication Dial-In User Service (RADIUS) protocol authentication, authorization and accounting (AAA) server and a RADIUS client.

17. A non-transitory computer-readable medium as recited in claim 11, wherein the computational function is any one of a one-way hash function and a pseudo-random function.

18. A non-transitory computer-readable medium as recited in claim 11, wherein the device identifier value is a Network Address Identifier (NAI).

19. A non-transitory computer-readable medium as recited in claim 11, wherein the encryption key is a Protected Access Credential (PAC) key.

20. A non-transitory computer-readable medium as recited in claim 11, wherein the steps are performed by a Terminal Access Controller Access Control System (TACACS) protocol authentication, authorization and accounting (AAA) server and a TACACS client.

21. A method, comprising:
at a network device that acts as a Remote Authentication Dial-In User Service (RADIUS) protocol client and authenticates itself in a network in communication with a RADIUS server, receiving and storing a Protected Access Credential (PAC) key, a Network Address Identifier (NAI), and verification data comprising a copy of the PAC key and the NAI encrypted using a private key of the RADIUS server;
the network device generating a RADIUS shared secret by applying a one-way hash function to the PAC key and the NAI;
the network device creating a RADIUS Access-Request message that includes the verification data in an opaque attribute-value pair;
the network device generating, based on the RADIUS shared secret, a first message integrity check value for the RADIUS Access-Request message;
the network device sending the RADIUS Access-Request message, the first message integrity check value, and the verification data to the RADIUS server;
at the RADIUS server, decrypting the verification data using the private key of the RADIUS server;
the RADIUS server extracting the PAC key and the NAI from the verification data;
the RADIUS server generating the same RADIUS shared secret by applying the same one-way hash function to the PAC key and the NAI;
the RADIUS server generating, based on the RADIUS shared secret, a second message integrity check value for the RADIUS Access-Request message; and
the RADIUS server generating and sending a RADIUS Access-Response message to the network device in response to the RADIUS Access-Request message at the RADIUS server only when the first message integrity check value matches the second message integrity check value,
wherein the shared secret is independently generated at each of the network device and the RADIUS server.

22. A method as recited in claim 21, further comprising:
generating the PAC key and the NAI for a particular network device;
encrypting the PAC key and the NAI using the private key, to result in creating the verification data, wherein the verification data comprises PAC Opaque data; and
providing the verification data to the particular network device through a secure communication channel.

23. An apparatus operable to secure authentication, authorization and accounting (AAA) protocol messages, the apparatus comprising:
one or more processors; and
one or more stored sequences of instructions which, when executed by the one or more processors, are operable at least to:
execute an AAA server that is operable to authenticate a network device that acts as an AAA client;
the AAA server receives, from the network device, an AAA message, a first message integrity check value for the AAA message, and a verification data;
wherein the verification data comprises in part a copy of an encryption key and a device identifier value that have been encrypted using a private key of the AAA server;
wherein the encryption key, the device identifier value, and the verification data have been stored at the network device;
the AAA server decrypts the verification data received from the network device using the private key of the AAA server;
the AAA server extracts the encryption key and the device identifier value from the verification data;
the AAA server generates a shared secret by applying a computational function to the encryption key and the device identifier value;
wherein the same shared secret has been generated at the network device;
the AAA server generates, based on the shared secret, a second message integrity check value for the AAA message; and
further process the AAA message only when the first message integrity check value matches the second message integrity check value,
wherein the shared secret is independently generated at each of the network device and the AAA server.

24. The apparatus of claim 23, wherein the one or more stored sequences of instructions further comprise instructions which, when executed by the one or more processors, are operable to:
create an AAA response message;
generate a third message integrity check value for the AAA response message using the shared secret; and
send the AAA response message with the third message integrity check value.

25. The apparatus of claim 24, wherein the one or more stored sequences of instructions further comprise instructions which, when executed by the one or more processors, are operable to encrypt one or more portions of the AAA response message using at least one of the shared secret and a random initialization vector.

26. The apparatus of claim 23, wherein the one or more stored sequences of instructions further comprise instructions which, when executed by the one or more processors, are operable to:

prior to receiving the AAA message, the first message integrity check value, and the verification data, generate the encryption key and the device identifier value for the network device;

encrypt the encryption key and the device identifier value using the private key of the AAA server, to result in creating the verification data; and provide the verification data to the network device through a secure communication channel.

27. The apparatus of claim 23, wherein the AAA server is operable to process messages according to one or more of:

a Remote Authentication Dial-In User Service (RADIUS) protocol; and a Terminal Access Controller Access Control System (TACACS) protocol.

28. The apparatus of claim 23, wherein the computational function is any one of a one-way hash function and a pseudo-random function.

29. The apparatus of claim 23, wherein the device identifier value is a Network Address Identifier (NAI).

30. The apparatus of claim 23, wherein the encryption key is a Protected Access Credential (PAC) key.

* * * * *